United States Patent
Kortam et al.

(10) Patent No.: US 10,233,748 B2
(45) Date of Patent: Mar. 19, 2019

(54) ACOUSTIC ANISOTROPY USING STATISTICAL ANALYSIS

(71) Applicant: HALLIBURTON ENERGY SERVICES, INC., Houston, TX (US)

(72) Inventors: Taher A. Kortam, Katy, TX (US); Philip W. Tracadas, West University Place, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 29 days.

(21) Appl. No.: 15/122,062

(22) PCT Filed: Jun. 22, 2015

(86) PCT No.: PCT/US2015/036947
§ 371 (c)(1),
(2) Date: Aug. 26, 2016

(87) PCT Pub. No.: WO2016/209201
PCT Pub. Date: Dec. 29, 2016

(65) Prior Publication Data
US 2017/0159428 A1    Jun. 8, 2017

(51) Int. Cl.
*G01V 1/50* (2006.01)
*E21B 49/00* (2006.01)
*G01V 1/30* (2006.01)
*E21B 47/024* (2006.01)
*E21B 47/14* (2006.01)

(52) U.S. Cl.
CPC ............ *E21B 49/00* (2013.01); *E21B 47/024* (2013.01); *G01V 1/303* (2013.01); *G01V 1/50* (2013.01); *E21B 47/14* (2013.01); *G01V 2210/626* (2013.01); *G01V 2210/665* (2013.01)

(58) Field of Classification Search
CPC .... G01V 1/50; G01V 1/303; G01V 2210/626; G01V 2210/665; E21B 49/00; E21B 47/024; E21B 47/14
USPC .......................................................... 367/86
See application file for complete search history.

(56) References Cited

U.S. PATENT DOCUMENTS

| | | | |
|---|---|---|---|
| 6,930,616 | B2 | 8/2005 | Tang et al. |
| 7,652,951 | B2 | 1/2010 | Leggett, III et al. |
| 7,675,814 | B2 | 3/2010 | Mandal |
| 8,547,788 | B2 | 10/2013 | Wang et al. |
| 2011/0019501 | A1 | 1/2011 | Market |
| 2011/0175899 | A1 | 7/2011 | Bittar et al. |
| 2013/0125641 | A1* | 5/2013 | Chemali ................. E21B 47/00 73/152.47 |

OTHER PUBLICATIONS

"Hemisphere," Merriam-Webster, 2018, downloaded Jan. 18, 2018 from https://www.merriam-webster.com/dictionary/hemisphere, 10 pages.*
Korean Intellectual Property Office, International Search Report and Written Opinion, dated Mar. 30, 2016, 14 pages, Korea.

* cited by examiner

Primary Examiner — Daniel L Murphy
(74) Attorney, Agent, or Firm — Haynes and Boone, LLP (57) ABSTRACT

Acoustic anisotropy of downhole formations is determined using statistical analysis. During operation of a downhole system, acoustic slowness measurements are acquired around a borehole extending along a formation. Statistical analysis is performed on the acquired slowness measurements, whereby the maximum and minimum slownesses of the formation are determined.

23 Claims, 6 Drawing Sheets

Fig. 5 ic ANISOTROPY USING
STATISTICAL ANALYSIS

CROSS-REFERENCE TO RELATED APPLICATIONS

This application is a U.S. national stage patent application of International Patent Application No. PCT/US2015/036947, filed on Jun. 22, 2015, the benefit of which is claimed and the disclosure of which is incorporated herein by reference in its entirety.

FIELD OF THE DISCLOSURE

The present disclosure relates generally to downhole logging and, more specifically, to methods for determining acoustic anisotropy using statistical analysis of slowness measurements.

BACKGROUND

The collection of information relating to downhole conditions, commonly referred to as "logging," can be performed by several methods including "logging while drilling" ("LWD") and wireline logging. Downhole acoustic logging tools are often utilized to acquire various characteristics of earth formations traversed by the borehole. In such systems, acoustic waveforms are generated using a transmitter, and the acoustic responses are received using one or more receiver arrays. The acquired data is then utilized to determine the slownesses (velocities) of the formation to obtain a maximum slowness and a minimum slowness; and processing the maximum slowness and the minimum slowness obtained to determine the horizontal transverse acoustic anisotropy and the angular direction of the formation's maximum and minimum slownesses. The amount of anisotropy and the direction may be of use in well planning and formation evaluation; for example, to direct perforation guns or assess wellbore stability.

In order to determine the acoustic anisotropy slowness values, conventional techniques apply model fitting. In LWD configurations that collect many slowness measurements (perhaps 8 or more) randomly in azimuth around the borehole, one technique fits a periodic model with a cycle period of 180 degrees to these measurements. The resulting model's fit phase and amplitude are used to measure the anisotropy. Also, wireline logging may use an Alford rotation model to measure anisotropy from only four azimuthal slowness measurements, commonly acquired in a "cross-dipole" configuration.

However, such fitting methods are disadvantageous because the local formation anisotropy mechanism may be complex and, thus, may deviate from these model assumptions (in particular that the measured slowness varies sinusoidally with azimuth). Also, a non-random collection of azimuth measurements may bias the model results, thereby resulting in inaccurate slowness determinations.

DESCRIPTION OF ILLUSTRATIVE EMBODIMENTS

Illustrative embodiments and related methodologies of the present disclosure are described below as they might be employed in methods and systems to determine acoustic anisotropy of a formation using statistical analysis of slowness measurements. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

As described herein, illustrative systems and methods of the present disclosure are directed to determining acoustic anisotropy of a downhole formation using statistical analysis. In a generalized method of the present disclosure, a sonic or acoustic logging tool is deployed downhole along a wellbore. Acoustic slowness measurements, relative to the formation or borehole coordinates, are then acquired using the logging tool. Statistical analysis is performed on the acquired slowness measurements, whereby the maximum (i.e., fast) and minimum (i.e., slow) slownesses (i.e., velocities) and corresponding angles are determined. Accordingly, the illustrative methods of the present disclosure improve the sensitivity and detectability of acoustic anisotropy.

Unlike conventional anisotropy techniques, the methods described herein do not apply model fitting. As previously described, these model fitting techniques require the slowness measurement data to be fit into established patterns which may not resemble the pattern of a formation's local complex anisotropy mechanisms. In the illustrative methods described herein, however, the slowness measurements are processed using statistical analysis to thereby determine the maximum and minimum slownesses of the formation, as well as their corresponding angles. In general, statistical analysis uses many measurements of an unknown process in order to estimate that process' true properties directly from the measurements. As will be described below, the methods of the present disclosure divide the slowness measurements into groups (referred to herein as "bins"), whereby the measurements are averaged, or subjected to other statistical techniques, to thereby calculate a characteristic slowness for each bin. These characteristic slownesses are then compared to one another using further statistical analysis techniques in order to determine the maximum and minimum slownesses and angles. Through use of these statistical techniques, measurement errors are limited which result in a more robust system.

In yet other methods which further improve angle accuracy, a bifurcation of the binned slowness measurements is performed using polar coordinates. As a result, the bifurcated measurements are separated into a maximum slowness first azimuthal angle range of 90 degrees and a minimum slowness second azimuthal angle range of 90 degrees), which are then statistically analyzed in order to determine the characteristic maximum and minimum slowness measurements—from which the maximum and minimum slownesses and their angles are determined. These and other advantages will be apparent to those ordinarily skilled in the art having the benefit of this disclosure.

Figure 1A:
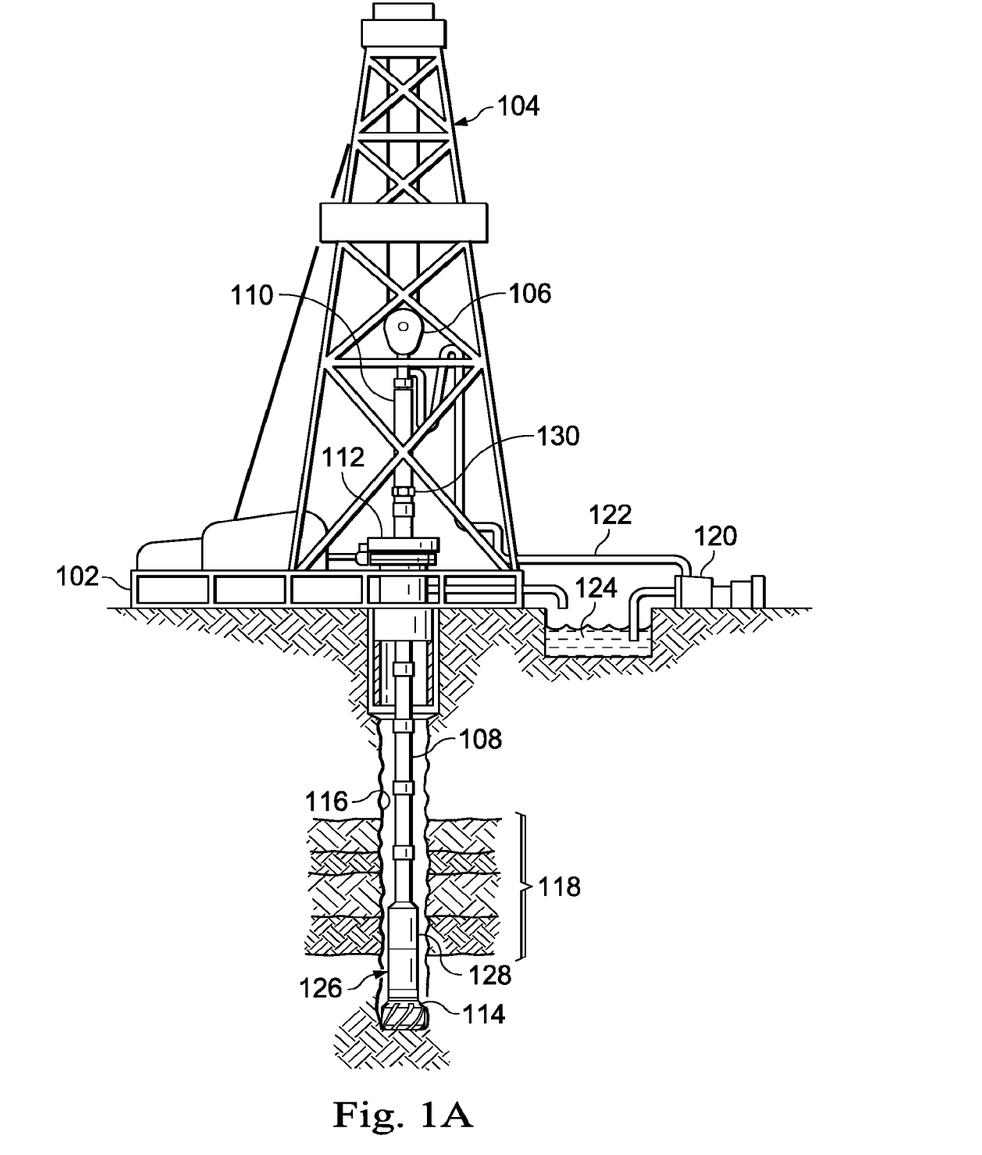
FIG. 1A illustrates an sonic/acoustic logging tool utilized in an LWD application, that acquires slowness measurement signals processed to determine the acoustic anisotropy using the illustrative statistical analysis methods described herein.

Illustrative methods of the present disclosure may be utilized in a variety of logging applications including, for example, LWD or MWD applications. FIG. 1A illustrates an sonic/acoustic logging tool utilized in an LWD application, that acquires slowness measurement signals processed using the illustrative statistical analysis methods described herein. The methods described herein may be performed by a system control center located on the logging tool or may be conducted by a processing unit at a remote location, such as, for example, the surface.

FIG. 1A illustrates a drilling platform 102 equipped with a derrick 104 that supports a hoist 106 for raising and lowering a drill string 108. Hoist 106 suspends a top drive 110 suitable for rotating drill string 108 and lowering it through well head 112. Connected to the lower end of drill string 108 is a drill bit 114. As drill bit 114 rotates, it creates a wellbore 116 that passes through various layers of a formation 118. A pump 120 circulates drilling fluid through a supply pipe 122 to top drive 110, down through the interior of drill string 108, through orifices in drill bit 114, back to the surface via the annulus around drill string 108, and into a retention pit 124. The drilling fluid transports cuttings from the borehole into pit 124 and aids in maintaining the integrity of wellbore 116. Various materials can be used for drilling fluid, including, but not limited to, a salt-water based conductive mud.

An acoustic logging tool 126 (also referred to herein as an "acoustic interrogation tool") is integrated into the bottom-hole assembly near bit 114. In this illustrative embodiment, logging tool 126 is an LWD sonic tool; however, in other illustrative embodiments, logging tool 126 may be utilized in a wireline or tubing-conveyed logging application. If the logging tool is utilized in an application which did not rotate the downhole assembly, the logging tool may be equipped with azimuthally-positioned sensors which acquire the slowness measurement around the borehole. In certain other illustrative embodiments, acoustic logging tool 126 may be adapted to perform logging operations in both open and cased hole environments.

In this example, acoustic logging tool 126 will include multipole-capable transmitters and receiver arrays (not shown) which generate acoustic waves in geological formations and record their transmission. In certain embodiments, the transmitters may direct their energies in substantially opposite directions, while in others a single transmitter may be utilized and rotated accordingly. The frequency, magnitude, angle and time of fire of the transmitter energy may also be controlled, as desired. In other embodiments, the collected slowness measurements may be stored and processed by the tool itself, while in other embodiments the measurements may be communicated to remote processing circuitry in order to conduct the statistical processing.

Acoustic logging tool 126 is utilized to acquire slowness measurement data at many azimuths. As such, certain embodiments may also include a directional sensor to determine the orientation of the tool. The illustrative methods described herein may be utilized in a variety of propagation modes, including, for example, compressional, shear, flexural, quadrupole or Stoneley modes.

Still referring to FIG. 1A, as drill bit 114 extends wellbore 116 through formations 118, logging tool 126 collects slowness measurement signals relating to various formation properties, as well as the tool orientation and various other drilling conditions. In certain embodiments, logging tool 126 may take the form of a drill collar, i.e., a thick-walled tubular that provides weight and rigidity to aid the drilling process. A telemetry sub 128 may be included to transfer slowness images and measurement data/signals to a surface receiver 130 and to receive commands from the surface. In some embodiments, telemetry sub 128 does not communicate with the surface, but rather stores slowness measurement data for later retrieval at the surface when the logging assembly is recovered.

In certain embodiments, acoustic logging tool 126 includes a system control center ("SCC"), along with necessary processing/storage/communication circuitry, that is communicably coupled to one or more transmitters/receivers (not shown) utilized to acquire slowness measurement signals. In certain embodiments, once the slowness measurement signals are acquired, the system control center calibrates the signals, performs the statistical processing methods described herein, and then communicates the data back uphole and/or to other assembly components via telemetry sub 128. In an alternate embodiment, the system control center may be located at a remote location away from logging tool 126, such as the surface or in a different borehole, and performs the statistical processing accordingly. These and other variations within the present disclosure will be readily apparent to those ordinarily skilled in the art having the benefit of this disclosure.

Figure 1B:
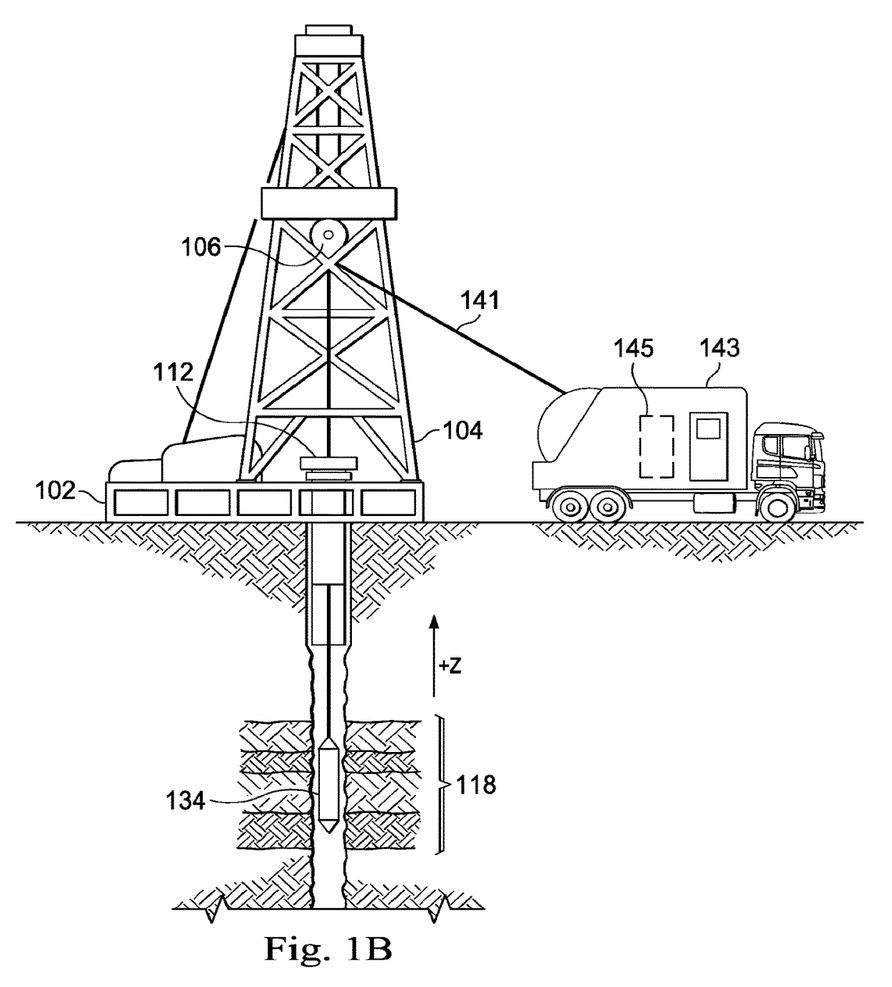
FIG. 1B illustrates an alternative embodiment of the present disclosure whereby a wireline acoustic logging tool acquires and statistically processes the slowness measurement signals.

FIG. 1B illustrates an alternative embodiment of the present disclosure whereby a wireline acoustic logging tool acquires and statistically processes the slowness measurement signals. At various times during the drilling process, drill string 108 may be removed from the borehole as shown in FIG. 1B. Once drill string 108 has been removed, logging operations can be conducted using a wireline acoustic logging sonde 134, i.e., an acoustic probe suspended by a cable 141 having conductors for transporting power to the sonde and telemetry from the sonde to the surface. A wireline acoustic logging sonde 134 may have pads and/or centralizing springs to maintain the tool near the axis of the borehole as the tool is pulled uphole. Acoustic logging sonde 134 can include a variety of transmitters/receivers for measuring acoustic anisotropy. A logging facility 143 collects measurements from logging sonde 134, and includes a computer system 145 for processing and storing the slowness measurements gathered by the sensors, as described herein.

In certain illustrative embodiments, the system control centers utilized by the acoustic logging tools described herein include at least one processor embodied within system control center and a non-transitory and computer-readable storage, all interconnected via a system bus. Software instructions executable by the processor for implementing the illustrative statistical processing methods described herein in may be stored in local storage or some other computer-readable medium. It will also be recognized that the statistical processing software instructions may also be loaded into the storage from a CD-ROM or other appropriate storage media via wired or wireless methods.

Moreover, those ordinarily skilled in the art will appreciate that various aspects of the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and/or remote computer-storage media including memory storage devices. The present disclosure may therefore, be implemented in connection with various hardware, software or a combination thereof in a computer system or other processing system.

Figure 2:
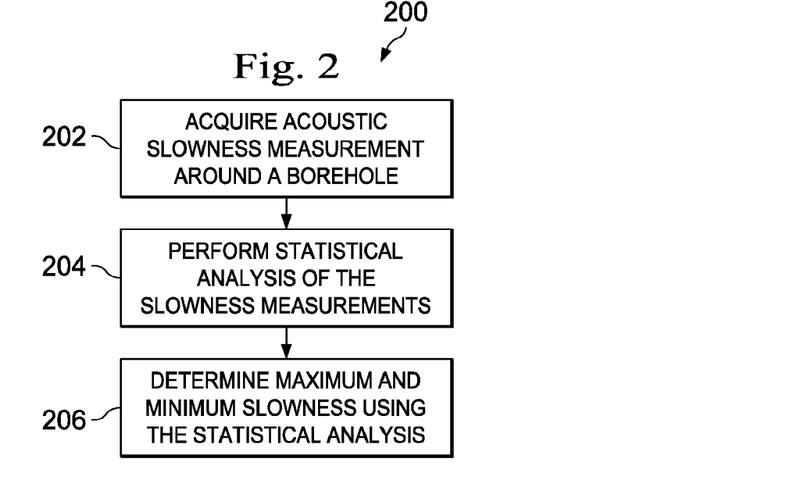
FIG. 2 is a flow chart of a method for determining a maximum and minimum slowness of a formation using statistical analysis, according to certain illustrative methods of the present disclosure.

Now that two illustrative applications of the present disclosure have been described, a more detailed description of the theory underpinning the present disclosure will now be provided. FIG. 2 is a flow chart of a method 200 for determining a maximum and minimum slowness of a formation using statistical analysis, according to certain illustrative methods of the present disclosure. After the acoustic logging tool has been deployed into a borehole, a number of acoustic slowness measurements are acquired around the borehole at block 202. For example, an LWD acoustic tool that is spinning with the bottom hole assembly and drill pipe rotation, may take many sonic slowness measurements at many angles (in any reference frame desired) while the bottom hole assembly is drilling, tripping, circulating, rotating, reaming, etc. The slowness measurements may be acquired in a variety of ways, including, for example, using a magnetic azimuth, a north azimuth, highside, or other angle reference, within a short along-hole length (e.g., within a few inches or a few seconds). As will be described below, each acoustic acquisition may be processed independently to yield an acoustic slowness measurement, which is then paired with the reference angle of that same acquisition.

Figure 3:
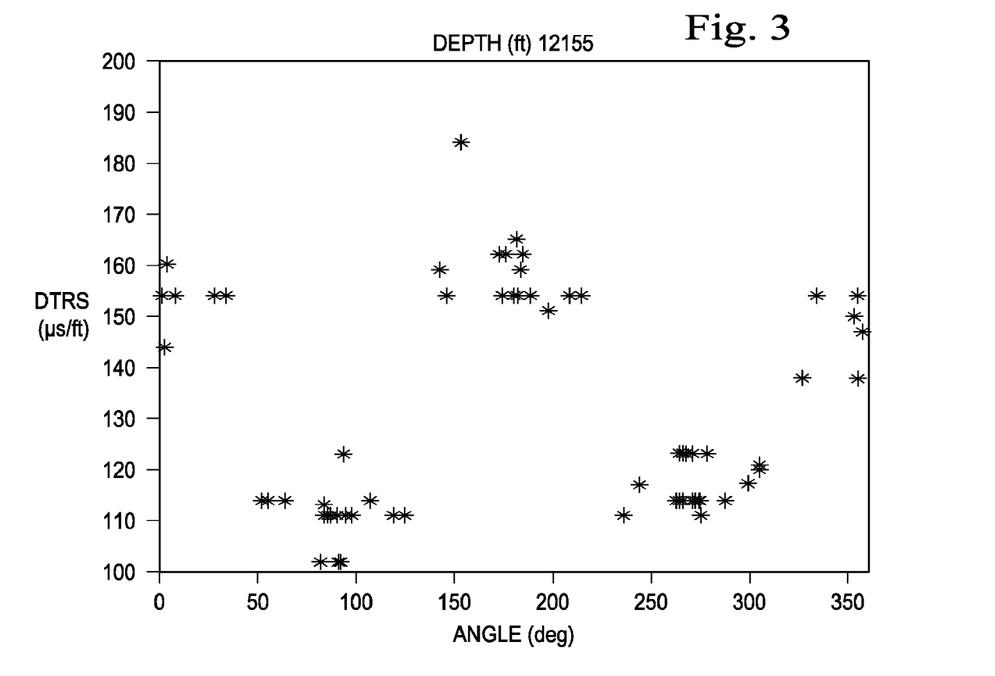
FIG. 3 is a graph of acquired slowness measurements verses their assigned reference angles relative to the borehole.

Still referring to block 202, in certain methods the short along-hole length may be user-defined. However, in other methods, a computed-optimum along-hole length is used to collect neighboring acoustic acquisitions (and their processed measurements) for analysis of acoustic anisotropy. For example, all acoustic slowness measurements within 1 ft along the hole while the tool (or bottom hole assembly) is spinning and drilling may be part of a collection. In certain methods, these collected slowness measurements may be displayed using a graph of acquired slowness measurements verses their assigned reference angles relative to the borehole, as shown in FIG. 3. DTRS represents the slowness measurement ("DT" or delta T) of the refracted shear ("RS") propagation mode. Note, however, that other propagation modes may be utilized, as DTRS is one example.

Referencing FIG. 3, one illustrative method of the present disclosure may take slowness measurement from this collection with the slowest (i.e., maximum slowness value) slowness and call that measurement's reference angle as the "slow angle." In FIG. 3, at a depth of 12,155 feet, the maximum slowness would be roughly 185 µs/feet at an angle of 150°. Similarly, identifying the fastest (i.e., minimum slowness value) slowness measurement would give the "fast angle." In FIG. 3, the minimum slowness would be roughly 102 µs/feet at an angle of 90°. However, dependence on one slowness measurement each to identify both maximum and minimum slownesses and their angles for the formation ignores the other collected measurements shown in FIG. 3. Moreover, such a simplified method is subject to measurement errors and may give results that violate expected formation acoustic horizontal transverse anisotropy symmetries. The collected measurements require further analysis in order to render the acoustic anisotropy analysis more robust.

Accordingly, with reference to block 204 of FIG. 2, illustrative methods of the present disclosure perform statistical analysis of the acquired slowness measurements, thereby limiting errors and providing a more robust analysis. The methods described herein assume the measured formation is horizontally transverse isotropic ("HTI") in relation to the borehole geometry. Therefore, due to either stress or intrinsic anisotropy of HTI formations, the slowness measurements around the borehole are symmetrical by 180° degrees. In other words, an HTI formation that has a slowness in a given angle direction should have that same value of slowness in the angle direction that is 180° from the given angle.

Figure 4A:
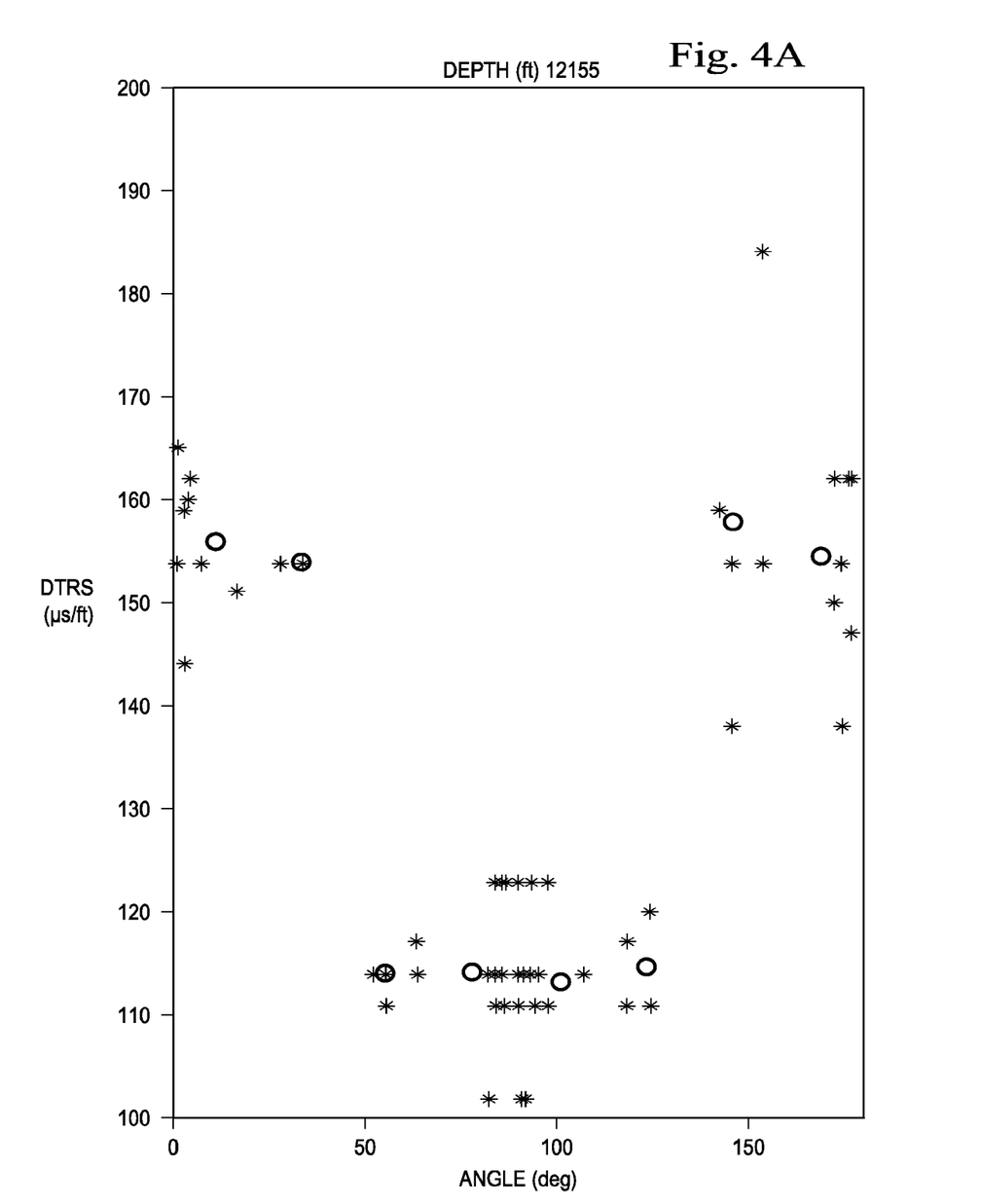
FIGS. 4A and 4B are graphs of acquired slowness measurements (stars) wrapped to the 0-180° range and the averaged bin estimates (i.e., characteristic slownesses) (circles) assuming an 8 bin resolution (FIG. 4A) and a 16 bin resolution (FIG. 4B)
Figure 4B:
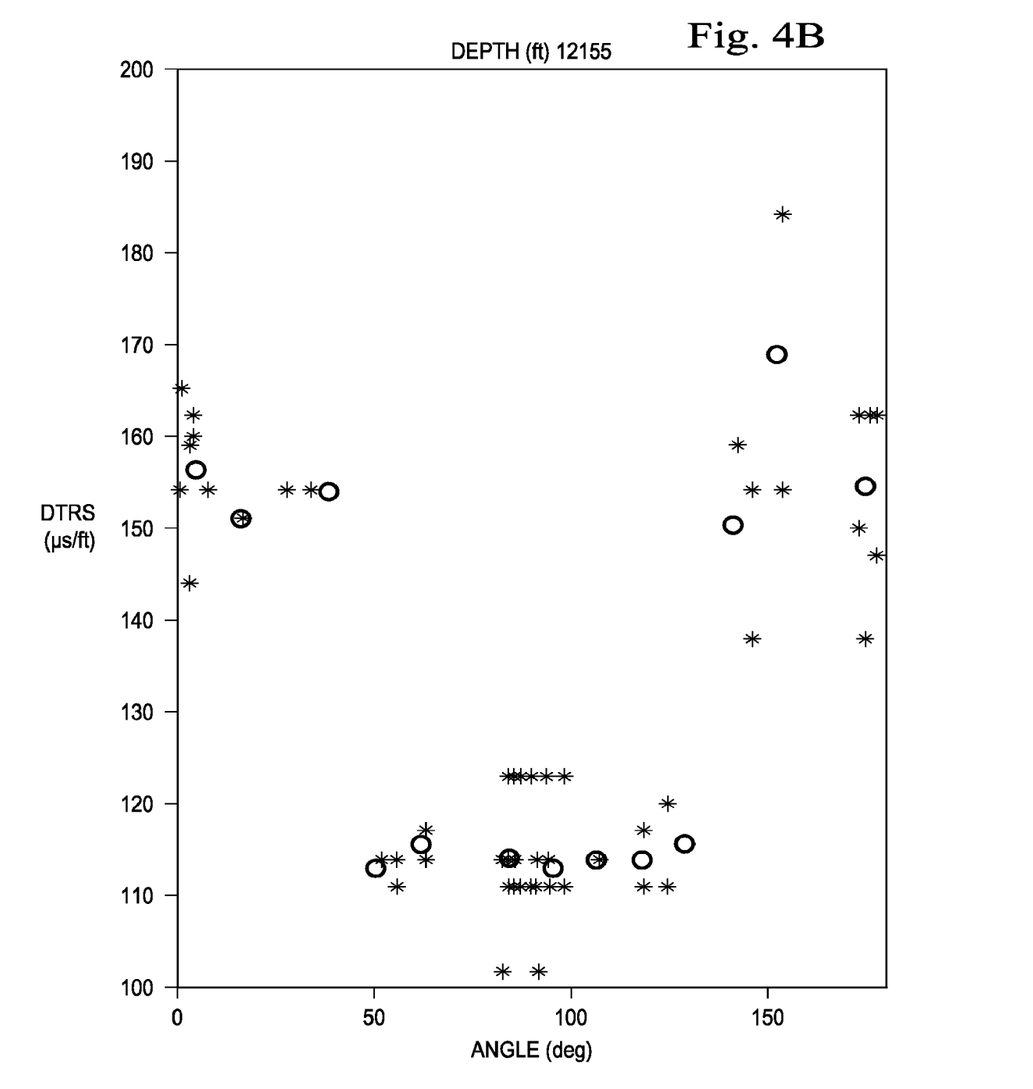

Therefore, in one illustrative method of block 204, the statistical analysis is performed by taking slowness measurements between the 180° and 360° reference angles, and subtracting 180° from their reference angles to thereby reassign them into the 0° to 180° range. Since the distribution of reference slowness angles is usually random, their resolution may be regularized by dividing the 0-180° range measurements up into a plurality of bins (for example, 8 bins of 22.5° each, or 4 bins of 45° each). Once the bins have been generated, each bin's slowness measurements are statistically analyzed (e.g., averaged) to thereby determine a characteristic slowness for each bin. FIGS. 4A and 4B are graphs of acquired slowness measurements (stars) wrapped to the 0-180° range and the averaged bin estimates (i.e., characteristic slownesses) (circles) assuming an 8 bin resolution (4A) and a 16 bin resolution (4B). This averaging adds robustness to the acoustic anisotropy slowness calculations because single outlier measurements, like the one at 150°, do not override the underlying (and possibly unknown) trend of the data.

Still referring to block 204 of FIG. 2, the illustrative methods described herein further assume that an HTI formation's maximum slowness direction is approximately perpendicular to the minimum slowness direction. Therefore, this assumption is applied in searching for the fastest and slowest bin by analyzing bin slowness differences. For example, with reference to FIGS. 4A & B, for an 8 bin resolution in a 0-180° range, bins 1 and 5 are 90° degrees (perpendicular) to each other; as are bins 2 and 6, 3 and 7, and 4 and 8. By taking the absolute differences of a bin pair (for example, using the characteristic slownesses or combined with other bin statistics, such as bin standard deviation) for all pairs, the pair with the largest absolute difference may be identified. This pair may then be considered to contain the maximum slowness and minimum slowness measurements desired for HTI anisotropy identification.

Once the bin pair has been determined, the bin with the slower estimated slowness is analyzed. In certain methods, the algorithm may use this estimated bin measurement, or the slowest actual measurement within the bin, or some other statistical measurement of the data to get the desired "slow" or maximum slowness measurement. Similarly, the reference (e.g., middle) angle of the bin, actual measurement within the bin, or some other angle estimate may be used to get the desired "slow angle" relative to the borehole. For example, the reference angle of FIGS. 4A & B is roughly 90°. A similar (but inverted logic) may be used to identify the "fast" or minimum slowness measurement and "fast angle" from the bin with the fastest estimated slowness. Accordingly, in this example, through comparison of the characteristic slowness measurements, the maximum and minimum slowness and their angles relative to the formulation are determined at block 206.

Figure 5:
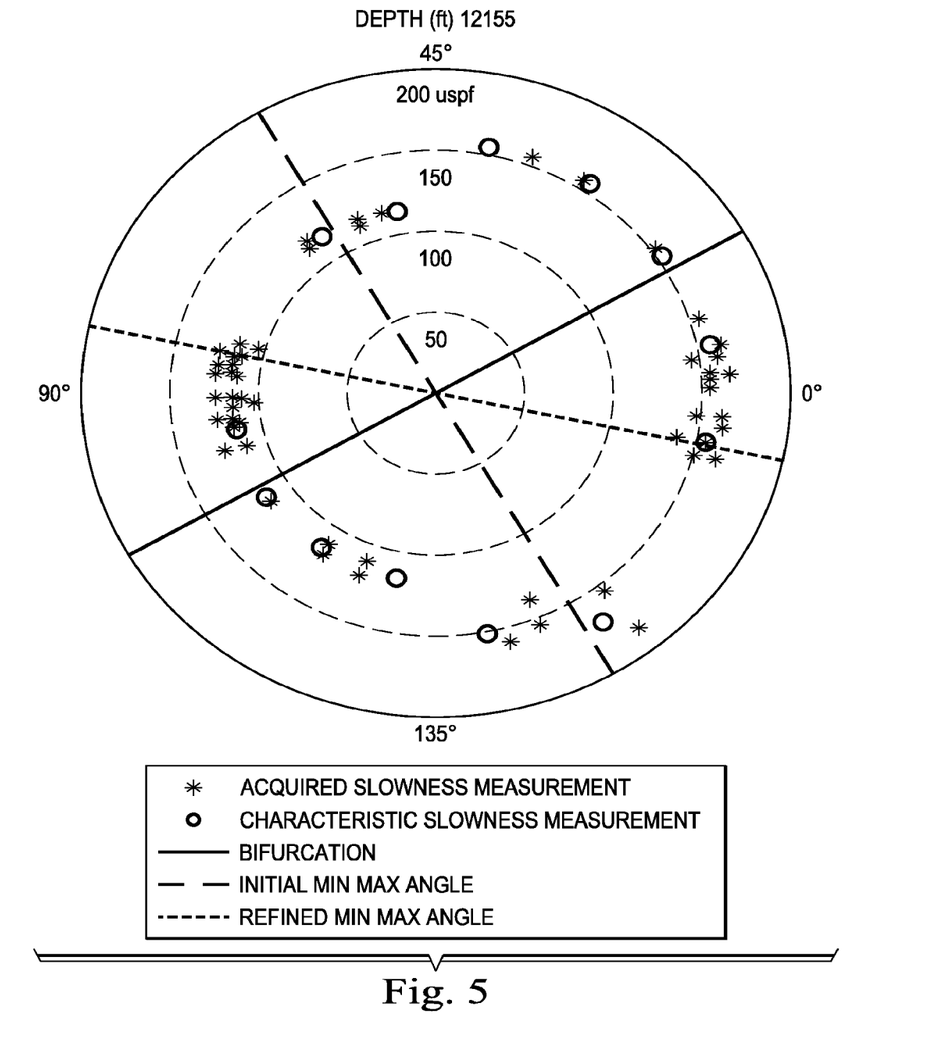
FIG. 5 is a graph showing the acquired slowness measurements and the characteristic slowness measurements (bin averages) plotted in a polar coordinate system, applying a bifurcation method of the present disclosure.

In an alternate method of the present disclosure, bifurcation of the slowness measurements is utilized to add robustness to the statistical analysis. FIG. 5 is a graph showing the acquired slowness measurements and the characteristic slowness measurements (bin averages) plotted in a polar coordinate system. For improved slowness angle accuracy, the maximum and minimum slowness angles may be used to bifurcate the data into regions for further analysis. By presenting the slowness measurements versus angle measurements in a polar representation, where the polar angle is 0-180 degrees and the polar radius is the slowness measurement, the fast and slow measurements will naturally group in different 90 degree azimuthal angle ranges (i.e., maximum and minimum slowness 90 degree azimuthal angle ranges) from which the averaged bin estimates (characteristic slowness measurements) are determined. For example, after determining the largest absolute difference between characteristic slowness measurements of bin pairs (as described above), the initial maximum and minimum slowness angles are illustrated in FIG. 5 at ~60° and 150°—which separate the slowness data into maximum and minimum 90 degree azimuthal angle ranges.

Using bifurcation lines that are a defined degree (e.g., 45°) from the previously determined fast and slow (bin pair) angles (~60° and 150°), all or some (e.g., the measurements above the mean 90 degree azimuthal angle range slowness) of the maximum slowness 90 degree azimuthal angle range measurements can be averaged (e.g., using Cartesian-transformed coordinates to average the measurement points and then transformed back to angle vs. slowness) to obtain a better maximum slowness and angle estimate. In FIG. 5, the bifurcation line is at ~105° and 15°. Again, all or some (e.g., the measurements above or below the mean slowness in the 90 degree azimuthal angle range) of the minimum slowness in the 90 degree azimuthal angle range measurements can be averaged, whereby a refined maximum and minimum slowness angle is determined. In an alternative method, the bifurcation line may be used to mirror the data to confirm the orientation between fast and slow directions.

Using the statistical processing methods described herein, a full 2D or 3D image of the acoustic properties of the borehole may be provided using any variety of imaging techniques. Such images may be utilized for a variety of applications, including, for example, geosteering of a downhole drilling assembly.

Accordingly, through use of statistical analysis, the illustrative methods of the present disclosure improve the sensitivity and detectability of acoustic anisotropy acquired using sonic tools that measure slowness around the borehole.

Embodiments of the present disclosure described herein further relate to any one or more of the following paragraphs:

1. A method to determine acoustic anisotropy, comprising acquiring acoustic slowness measurements around a borehole extending along a formation; performing statistical analysis on the slowness measurements; and determining a maximum and minimum slowness of the formation based upon the statistical analysis.

2. A method as defined in claim paragraph 1, wherein determining the maximum and minimum slownesses further comprises determining a maximum and minimum slowness angle relative to the borehole.

3. A method as defined in paragraphs 1 or 2, wherein performing the statistical analysis comprises grouping the slowness measurements into a plurality of bins; and averaging the slowness measurements in each bin to determine a characteristic slowness for each bin, wherein the characteristic slowness measurements are compared to one another in order to determine the maximum and minimum slownesses.

4. A method as defined in any of paragraphs 1-3, further comprising determining a characteristic maximum and minimum slowness angle relative to the borehole; utilizing the characteristic slowness angles to bifurcate the slowness measurements of each bin within a polar coordinate system, thereby separating the slowness measurements into a maximum slowness hemisphere and a minimum slowness hemisphere; averaging the slowness measurements in the maximum slowness hemisphere to determine a characteristic maximum slowness measurement; and averaging the slowness measurements in the minimum slowness hemisphere to determine a characteristic minimum slowness measurement, thereby determining the maximum and minimum slownesses.

5. A method as defined in any of paragraphs 1-4, wherein bifurcating the slowness measurements further comprises using a bifurcation line positioned at a defined degree from the slowness angles.

6. A method as defined in any of paragraphs 1-5, wherein grouping the slowness measurements into the plurality of bins comprises assigning a 360 degree reference angle to each slowness measurement; for those slowness measurements having references angles in a 180-360 degree range, subtracting 180 degrees from the reference angles to thereby reassigned those slowness measurements into a 0-180 degree range; and dividing the slowness measurements in the 0-180 degree range into the plurality of bins; and averaging the slowness measurements in each bin further comprises selecting bin pairs that are approximately perpendicular to one another; and analyzing each bin pair to determine a largest absolute difference in the characteristic slowness measurements, thereby determining the maximum and minimum slownesses.

7. A method as defined in any of paragraphs 1-6, wherein the acoustic slowness measurements are acquired using a rotating acoustic interrogation tool.

8. A method as defined in any of paragraphs 1-7, wherein the acoustic slowness measurements are acquired using a stationary acoustic interrogation tool having azimuthally-positioned sensors.

9. A method as defined in any of paragraphs 1-8, wherein the acoustic slowness measurements are acquired using a compressional, shear, flexural, quadropole or Stoneley propagation mode.

10. A system to determine acoustic anisotropy, comprising a downhole assembly comprising at least one transmitter and receiver; and processing circuitry communicably coupled to the transmitter and receiver, the processing circuitry being configured to implement any of the methods of paragraphs 1-9.

11. A system as defined in paragraph 10, wherein the downhole assembly is a drilling or wireline assembly.

Moreover, the foregoing paragraphs and other methods described herein may be embodied within a system comprising processing circuitry to implement any of the methods, or a in a computer-program product comprising instructions which, when executed by at least one processor, causes the processor to perform any of the methods described herein.

Although various embodiments and methods have been shown and described, the disclosure is not limited to such embodiments and methodologies and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A method to determine acoustic anisotropy, comprising:
   acquiring acoustic slowness measurements of a formation surrounding a borehole that extends through the formation;
   performing statistical analysis on the slowness measurements, wherein performing the statistical analysis comprises:
      grouping the slowness measurements into a plurality of bins, the plurality of bins being a multiple of four bins, with each bin representing an equal yet separate portion of a range of azimuthal angles from 0 to 180 degrees around the borehole axis; and
      averaging the slowness measurements in each bin to determine a characteristic slowness for each bin;
   determining a maximum slowness and a minimum slowness of the formation based upon the statistical analysis, wherein the characteristic slownesses are compared to one another in order to determine the maximum and minimum slownesses;
   determining characteristic azimuthal angles of the maximum and minimum slownesses around the borehole axis, with the characteristic azimuthal angle of the maximum slowness being 90 degrees from the characteristic azimuthal angle of the minimum slowness;
   utilizing the characteristic azimuthal angles to separate the slowness measurements into a maximum slowness first azimuthal angle range of 90 degrees and a minimum slowness second azimuthal angle range of 90 degrees;
   averaging the slowness measurements in the maximum slowness first azimuthal angle range of 90 degrees to determine a characteristic maximum slowness measurement; and
   averaging the slowness measurements in the minimum slowness second azimuthal angle range of 90 degrees to determine a characteristic minimum slowness measurement, thereby determining the maximum and minimum slownesses.

2. A method as defined in claim 1, wherein determining the maximum and minimum slownesses further comprises determining a maximum and minimum slowness azimuthal angle around an axis of the borehole.

3. A method as defined in claim 1, wherein separating the slowness measurements further comprises using a bifurcation line positioned at a defined degree from the slowness angles.

4. A method as defined in any one of claim 1, 2, or 3, wherein the acoustic slowness measurements are acquired using a rotating acoustic interrogation tool.

5. A method as defined in any one of claim 1, 2, or 3, wherein the acoustic slowness measurements are acquired using a stationary acoustic interrogation tool having azimuthally-positioned sensors.

6. A method as defined in any one of claim 1, 2, or 3, wherein the acoustic slowness measurements are acquired using a compressional, shear, flexural, quadrupole or Stoneley propagation mode.

7. A system to determine acoustic anisotropy, comprising:
   a downhole assembly comprising at least one transmitter and one receiver array; and
   processing circuitry communicably coupled to the transmitter and the receiver array, the processing circuitry being configured to implement any of the methods of claim 1, 2, or 3.

8. A system as defined in claim 7, wherein the downhole assembly is a drilling or wireline assembly.

9. A computer-program product comprising instructions which, when executed by at least one processor, causes the processor to perform any of the methods of claim 1, 2, or 3.

10. A method to determine acoustic anisotropy, comprising:
    acquiring acoustic slowness measurements of a formation surrounding a borehole that extends through the formation;
    performing statistical analysis on the slowness measurements, wherein performing the statistical analysis comprises:
    grouping the slowness measurements into a plurality of bins, the plurality of bins being a multiple of four bins, with each bin representing an equal yet separate portion of a range of azimuthal angles from 0 to 180 degrees around the borehole axis; and
    averaging the slowness measurements in each bin to determine a characteristic slowness for each bin,
    wherein the characteristic slownesses are compared to one another in order to determine the maximum and minimum slownesses;
    whereby grouping the slowness measurements into the plurality of bins comprises:
       assigning a 360 degree reference azimuthal angle, around the borehole axis, to each slowness measurement;
       for those slowness measurements having reference azimuthal angles in a 180-360 degree range, subtracting 180 degrees from the reference azimuthal angles to thereby reassign those slowness measurements into a 0-180 degree range; and
       dividing the slowness measurements in the 0-180 degree range into the plurality of bins; and
    averaging the slowness measurements in each bin further comprises:
       selecting bin pairs such that each azimuthal angle in one of the bins of the bin pair is 90 degrees from a corresponding azimuthal angle in the other bin of the bin pair;
       analyzing each bin pair to determine a largest absolute difference in the characteristic slowness measurements, thereby determining the maximum and minimum slownesses; and
       determining a maximum slowness and a minimum slowness of the formation based upon the statistical analysis.

11. A method as defined in claim 10, wherein determining the maximum and minimum slownesses further comprises determining a maximum and minimum slowness azimuthal angle around an axis of the borehole.

12. A method as defined in any one of claims 10-11, wherein the acoustic slowness measurements are acquired using a rotating acoustic interrogation tool.

13. A method as defined in any one of claims 10-11, wherein the acoustic slowness measurements are acquired using a stationary acoustic interrogation tool having azimuthally-positioned sensors.

14. A method as defined in any one of claims 10-11, wherein the acoustic slowness measurements are acquired using a compressional, shear, flexural, quadrupole or Stoneley propagation mode.

15. A system to determine acoustic anisotropy, comprising:
   a downhole assembly comprising at least one transmitter and one receiver array; and
   processing circuitry communicably coupled to the transmitter and the receiver array, the processing circuitry being configured to implement any of the methods of claims 10-11.

16. A system as defined in claim 15, wherein the acoustic slowness measurements are acquired using a rotating acoustic interrogation tool.

17. A system as defined in claim 15, wherein the acoustic slowness measurements are acquired using a stationary acoustic interrogation tool having azimuthally-positioned sensors.

18. A system as defined in claim 15, wherein the acoustic slowness measurements are acquired using a compressional, shear, flexural, quadrupole or Stoneley propagation mode.

19. A system as defined in claim 15, wherein the downhole assembly is a drilling or wireline assembly.

20. A non-transitory computer-program product comprising instructions which, when executed by at least one processor, causes the processor to perform any of the methods of claims 10-11.

21. A computer-program product as defined in claim 20, wherein the acoustic slowness measurements are acquired using a rotating acoustic interrogation tool.

22. A computer-program product as defined in claim 20, wherein the acoustic slowness measurements are acquired using a stationary acoustic interrogation tool having azimuthally-positioned sensors.

23. A computer-program product as defined in claim 20, wherein the acoustic slowness measurements are acquired using a compressional, shear, flexural, quadrupole or Stoneley propagation mode.

* * * * *

UNITED STATES PATENT AND TRADEMARK OFFICE
CERTIFICATE OF CORRECTION

PATENT NO. : 10,233,748 B2
APPLICATION NO. : 15/122062
DATED : March 19, 2019
INVENTOR(S) : Taher A. Kortam and Philip W. Tracadas Page 1 of 1

It is certified that error appears in the above-identified patent and that said Letters Patent is hereby corrected as shown below:

In the Specification

Column 7, Line 11 - change "formulation" to --formation--

Signed and Sealed this
Eighth Day of October, 2019

Andrei Iancu
*Director of the United States Patent and Trademark Office*